J. BEHM.
CHILD'S VEHICLE.
APPLICATION FILED MAR. 24, 1919.

1,364,686.

Patented Jan. 4, 1921.

Inventor
John Behm,
By

UNITED STATES PATENT OFFICE.

JOHN BEHM, OF GRAND HAVEN, MICHIGAN, ASSIGNOR OF ONE-HALF TO JAMES W. OAKES, OF GRAND HAVEN, MICHIGAN.

CHILD'S VEHICLE.

1,364,686.  Specification of Letters Patent.  Patented Jan. 4, 1921.

Application filed March 24, 1919. Serial No. 284,849.

*To all whom it may concern:*

Be it known that I, JOHN BEHM, a citizen of the United States, residing at Grand Haven, in the county of Ottawa and State of Michigan, have invented certain new and useful Improvements in Children's Vehicles, of which the following is a specification.

My invention relates to improvements in coasting vehicles for children's sports, and its objects are: first, to provide a coasting vehicle that may be used upon level surfaces, or upon down grades; second, to provide a vehicle of the class named that may be held steadily when descending steep grades, and, third, to provide means whereby the operator may positively guide the vehicle, and hold it steady with the feet when descending steep grades.

Figure 1:
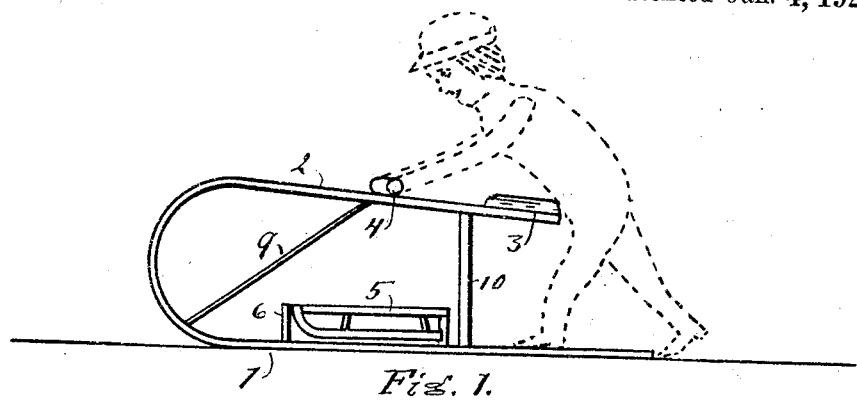
Figure 2:
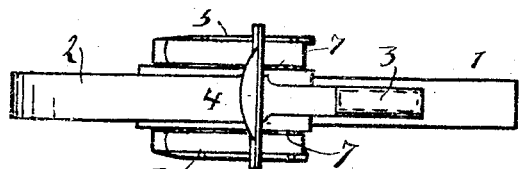
Figure 4:
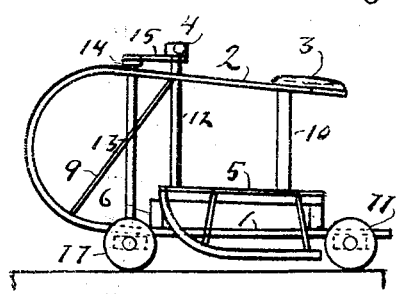
Figure 5:
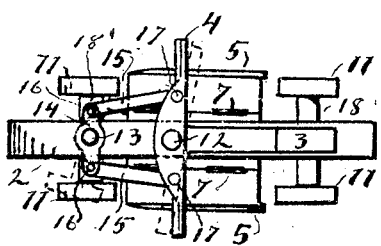
Figure 3:
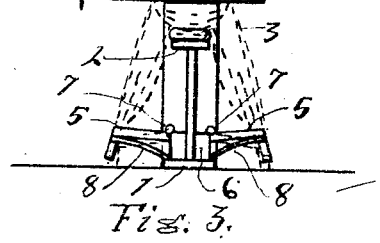

I attain these objects by the mechanism shown in the accompanying drawing in which Figure 1 is a side elevation of the vehicle. Fig. 2 is a plan of the same. Fig. 3 is a back elevation. Fig. 4 is a side elevation of a modification of the vehicle mounted upon wheels, and, Fig. 5 is a plan of the same. In Figs. 1 and 3 I have shown the outlines of a child upon the vehicle to indicate, in the first instance, his position when coasting upon a level surface and, in the second instance, to show his position when coasting down hill.

Similar reference numerals indicate similar parts throughout the several views.

In the construction of this vehicle I form a broad runner 1, the front end of which supporting element is curved and extended backwardly sufficiently to form the seat portion 2, having a seat cushion 3 thereon. I strengthen the vehicle with a post 9, and support the seat portion with a standard 10, and place a handle bar 4 in position so the operator may steady himself when riding upon the seat 3, as indicated in Fig. 3, or when standing upon the runner with one foot and propelling the vehicle with the other foot, as indicated in Fig. 1.

To complete my invention, I place a supporting element, as 6, upon the runner 1. This element may be wider or narrower than the runner, as desired, and upon the sides of this support I pivotally mount two runners and their supporting frames, as indicated at 5, by means of properly applied hinges 7, and arrange to hold these runners normally, off of the supporting surface by means of properly applied springs, as indicated at 8 in Fig. 3.

When coasting down hill the rider is seated upon the seat 3, with his feet upon the runner frame 5. If desiring to proceed directly down hill he presses both runners downwardly until they rest upon the supporting surface, and the vehicle is thereby held steadily in its course, and the danger of capsizing is thereby averted. If it is desired to turn to the right, or to the left, the corresponding runner, only, is pressed upon while the other runner is allowed to stand in its normal position out of contact with the supporting surface, the rider, in the mean time, supporting himself with the handle bar 4, as indicated in Fig. 3.

If it is desired to use the vehicle simply to slide, or glide along upon a level surface, the rider dismounts, places one foot upon the runner 1 and pushes upon the supporting surface with the other foot, steadying himself with the handle bar 4, as indicated in Fig. 1.

When using this vehicle for summer sports, small rollers or wheels 11 may be secured to the runner 1, thus making it a source of amusement the year around.

It is to be understood that the manner of mounting the runners 5 upon the vehicle, and the manner of holding them in normal position is immaterial so long as the desired results are attained by their use.

As this vehicle would be incomplete without being fully equipped for summer use, I will now go into a more extended description of this feature. The axletree 18, upon which the hind wheels are mounted, is rigidly attached to the runner, and the axletree 18' upon which the forward wheels are mounted is pivotally secured, as upon the end of the revoluble post 13. This post extends upwardly into position above the part 2, and has a hand-bar 14 mounted thereon by means of which the axletree may be made to oscillate for the purpose of guiding the vehicle in the direction it is desired it should travel. I find it convenient, in many instances, to mount the handle bar 4 in such a manner that it may be given an oscillating movement, as, for instance, by placing it upon a standard 12, which is here shown as extending downwardly and supported upon the support 6. In this construction I connect the handle bar 4 with the axletree post 14 by means of connecting rods 15 in such a manner that any oscillating movement of the handle bar will be transmitted to the wheels 11 and move them into the desired relative position, as indicated by their dotted lines in Fig. 5, for the purpose of guiding the vehicle. It is to be understood that this construction is shown as an available means to bring about the desired results, but not as the only available means, as many other means may be applied with success.

I find the runner element, 5, of my invention as essential for summer use as for winter use, for the reason that without some means for governing the speed of the vehicle when moving swiftly down hill, the momentum may become so great as to render the vehicle absolutely uncontrollable, and for this purpose, or if it is desired to temporarily convert the wheeled vehicle into a sliding vehicle, the runners are pressed firmly downwardly until the main weight of the vehicle and its load are supported upon the runners with the wheels barely skimming over the supporting surface, as the ground, or snow. I find this feature a source of great satisfaction to children where the ground is only partly covered with snow, with alternate patches here and there, of snow and bare ground, as giving them the sensation both of the smooth sliding movement of the runners on snow, and the jarring movement of the wheels upon the ground.

What I claim as new in the art, is:

1. In a child's toy vehicle, a single long, broad runner curved upwardly and backwardly at the front of the vehicle forming an elevated seat support, a hand bar connected with the backwardly extending part, a platform supported upon the runner, a sleigh runner and one half of its frame pivotally mounted upon each side of the platform and extending considerably to one side of the main runner, and means for holding said runners normally away from the surface upon which the main runner is supported, in condition to be made to contact said surface.

2. In a child's toy vehicle, a single long, broad runner curved upwardly and backwardly at the front end of the vehicle, an elevated seat and a hand bar connected with the vehicle, a platform attached to and elevated above the main runner, an auxiliary runner and its supporting frame pivotally mounted upon each side of the platform, springs holding said auxiliary runners and their frames normally off of the surface that supports the main runner, and in condition to be forced upon the supporting surface, wheels mounted upon the main runner, all so arranged that pressure upon the auxiliary runners will convert the wheeled vehicle into a sliding vehicle, and relieving the auxiliary runners will convert the sliding vehicle into a wheeled vehicle.

Signed at Grand Haven Michigan, March 8th, 1919.

JOHN BEHM.